United States Patent
Zarandi et al.

(10) Patent No.: US 11,925,985 B2
(45) Date of Patent: Mar. 12, 2024

(54) METHOD OF MAKING A RADIAL TURBINE WHEEL USING ADDITIVE MANUFACTURING

(71) Applicant: Hamilton Sundstrand Corporation, Charlotte, NC (US)

(72) Inventors: Faramarz M. Zarandi, Vernon, CT (US); Jesus A. Garcia, San Diego, CA (US); Evan J. Butcher, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 206 days.

(21) Appl. No.: 16/452,962

(22) Filed: Jun. 26, 2019

(65) Prior Publication Data
US 2020/0406354 A1   Dec. 31, 2020

(51) Int. Cl.
*B22F 3/105* (2006.01)
*B22F 3/15* (2006.01)
(Continued)

(52) U.S. Cl.
CPC ............. *B22F 3/24* (2013.01); *B22F 3/105* (2013.01); *B22F 3/15* (2013.01); *B22F 5/009* (2013.01); *B22F 5/04* (2013.01); *B22F 7/08* (2013.01); *B22F 10/25* (2021.01); *B22F 10/28* (2021.01); *B22F 10/38* (2021.01); *B22F 10/64* (2021.01);
(Continued)

(58) Field of Classification Search
None
See application file for complete search history.

(56) References Cited

U.S. PATENT DOCUMENTS 9,283,593 B2   3/2016   Bruck et al.
2013/0263977 A1*   10/2013   Rickenbacher ........... C22F 1/10
148/540
(Continued)

FOREIGN PATENT DOCUMENTS

WO     2015108599 A2     7/2015

OTHER PUBLICATIONS

I. Gibson, D.W. Rosen, and B. Stucker, Additive Manufacturing Technologies, DOI 10.1007/978-1-4419-1120-9_5, # Springer Science þ Business Media, LLC (Year: 2010).*

(Continued)

*Primary Examiner* — Anthony M Liang
(74) *Attorney, Agent, or Firm* — CANTOR COLBURN LLP

(57) ABSTRACT

Disclosed is a method of making a part, comprising: forming the part via an additive manufacturing process, wherein the additive manufacturing process comprises layering, melting, and solidifying a metal alloy based on a three dimensional numerical model, wherein the formed part comprises a microstructure, wherein the microstructure comprises an average columnar grain length; and heat treating the formed part, wherein heat treating comprises heating to between 750° C. and 1200° C. for a time between 0.5 hours and 10 hours and then cooling the formed part below 750° C., wherein after heat treating, the formed part has an average columnar grain length of about 400 micrometers to about 1000 micrometers, as measured using electron backscattered diffraction.

16 Claims, 2 Drawing Sheets

(51) Int. Cl.

| | |
|---|---|
| *B22F 3/24* | (2006.01) |
| *B22F 5/00* | (2006.01) |
| *B22F 5/04* | (2006.01) |
| *B22F 7/08* | (2006.01) |
| *B22F 10/25* | (2021.01) |
| *B22F 10/28* | (2021.01) |
| *B22F 10/38* | (2021.01) |
| *B22F 10/64* | (2021.01) |
| *C22C 1/04* | (2023.01) |
| *C22C 19/03* | (2006.01) |
| *C22F 1/10* | (2006.01) |
| *F01D 5/04* | (2006.01) |
| *B33Y 10/00* | (2015.01) |
| *B33Y 70/00* | (2020.01) |
| *B33Y 80/00* | (2015.01) |

(52) U.S. Cl.
CPC ............ *C22C 1/0433* (2013.01); *C22C 19/03* (2013.01); *C22F 1/10* (2013.01); *F01D 5/048* (2013.01); *B22F 2301/15* (2013.01); *B33Y 10/00* (2014.12); *B33Y 70/00* (2014.12); *B33Y 80/00* (2014.12)

(56) References Cited

U.S. PATENT DOCUMENTS

| | | | |
|---|---|---|---|
| 2016/0151860 A1 | 6/2016 | Engeli et al. | |
| 2017/0008126 A1* | 1/2017 | Long | B23K 26/0876 |
| 2017/0107821 A1* | 4/2017 | Schwarz | B23K 26/342 |
| 2018/0002795 A1 | 1/2018 | Das | |
| 2018/0056396 A1* | 3/2018 | Menon | B33Y 40/00 |
| 2018/0112531 A1 | 4/2018 | Abrari | |
| 2018/0216493 A1 | 8/2018 | Moniz et al. | |
| 2019/0039183 A1 | 2/2019 | Morton et al. | |
| 2019/0047049 A1 | 2/2019 | Fujieda et al. | |
| 2019/0085698 A1 | 3/2019 | Van Der Merwe et al. | |
| 2019/0134711 A1 | 5/2019 | Li | |

OTHER PUBLICATIONS

Pike, L. M. "Development of a fabricable gamma-prime (γ') strengthened superalloy." Superalloys 2008 (2008): 191-200. (Year: 2008).*

Yan, Fuyao, Wei Xiong, and Eric J. Faierson. "Grain structure control of additively manufactured metallic materials." Materials 10.11 (2017): 1260. (Year: 2017).*

Babu, Sudarsanam Suresh, et al. "Additive manufacturing of nickel superalloys: opportunities for innovation and challenges related to qualification." Metallurgical and Materials Transactions A 49.9 (2018): 3764-3780. (Year: 2018).*

Lee, Y. S., et al. "Role of scan strategies on thermal gradient and solidification rate in electron beam powder bed fusion." Additive Manufacturing 22 (2018): 516-527. (Year: 2018).*

Mahamood, Rasheedat Modupe. Laser Metal Deposition Process of Metals, Alloys, and Composite Materials. Germany, Springer International Publishing, 2017. (Year: 2017).*

Galizoni, Breno Boretti, et al. "Heat Treatments Effects on Nickel-Based Superalloy Inconel 713C." Metals, vol. 9, No. 1, 2019, p. 47., https://doi.org/10.3390/met9010047. (Year: 2019).*

Extended European Search Report issued in Application No. 19212598.7 dated May 19, 2020, 8 pages.

* cited by examiner

METHOD OF MAKING A RADIAL TURBINE WHEEL USING ADDITIVE MANUFACTURING

BACKGROUND

Exemplary embodiments pertain to the art of additive manufacturing, and more particularly, to the art of making a radial turbine wheel using additive manufacturing.)

An auxiliary power unit (APU) is a device on a vehicle that provides energy for functions other than propulsion and can include a gas turbine. For example, an APU gas turbine utilizes a turbine module, typically comprising a combustor, turbine nozzle, and turbine wheel. The turbine wheel (TW) can be either an axial or radial TW. The TW is a rotor which can be composed of an alloy material. The alloy material is designed to operate at high gas temperatures exiting the combustor. The high gas temperatures, and specifically turbine inlet temperatures, reduce the durability and life of the TW. The life of the TW is also dictated by the fatigue and creep rupture properties of the alloy material. The TW can be manufactured in the form of a casting and then machined to final dimensions. Materials conducive to a TW casting, for example, nickel alloys, can provide creep rupture strength capability superior to wrought nickel alloys, but inferior in fatigue strength. As a result, a cast and machined TW can experience low cycle fatigue life. The APU is removed from service after a specified number of start to stop cycles in order to avoid failure. The low cycle fatigue life will limit the time/number of cycles between servicing.

The superior creep rupture strength of a cast TW can be the result of its chemistry and its inherently coarse grain microstructure. The superior fatigue strength of a wrought TW can be the result of its inherently finer grain microstructure. Unfortunately, current wrought alloys, with the exception of a few exotic and overly expensive alloys, do not have sufficient creep rupture strength to endure typical high turbine inlet temperatures. A wrought TW is also costly to manufacture. Machining a TW from wrought stock or a forging can also present residual stress issues, and therefore fatigue life debits, in critical life limiting areas. Cast and machined TW's can experience random occurrences of subsurface oxide films developed during the casting process that can lead to premature cracking and fracture of the TW in service. These oxide films are not detectable by current means. Regarding reparability, the cast and machined TW is extremely difficult to weld repair and thus is typically thrown away and replaced with an expensive new part.

Therefore, there is a need to develop a method of making a radial turbine wheel which is cost effective, resistant to high turbine inlet temperatures, easily repairable, and which provides a balance of both creep and fatigue properties, for example, increased life cyclic limits.

BRIEF DESCRIPTION

Disclosed is a method of making a part, comprising: forming the part via an additive manufacturing process, wherein the additive manufacturing process comprises layering, melting, and solidifying a metal alloy based on a three dimensional numerical model, wherein the formed part comprises a microstructure, wherein the microstructure comprises an average columnar grain length; and heat treating the formed part, wherein heat treating comprises heating to between 750° C. and 1200° C. for a time between 0.5 hours and 10 hours and then cooling the formed part below 750° C., wherein after heat treating, the formed part has an average columnar grain length of about 400 micrometers to about 1000 micrometers, as measured using electron backscattered diffraction.

Also disclosed is a part made by the method, wherein the part is a radial turbine wheel.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
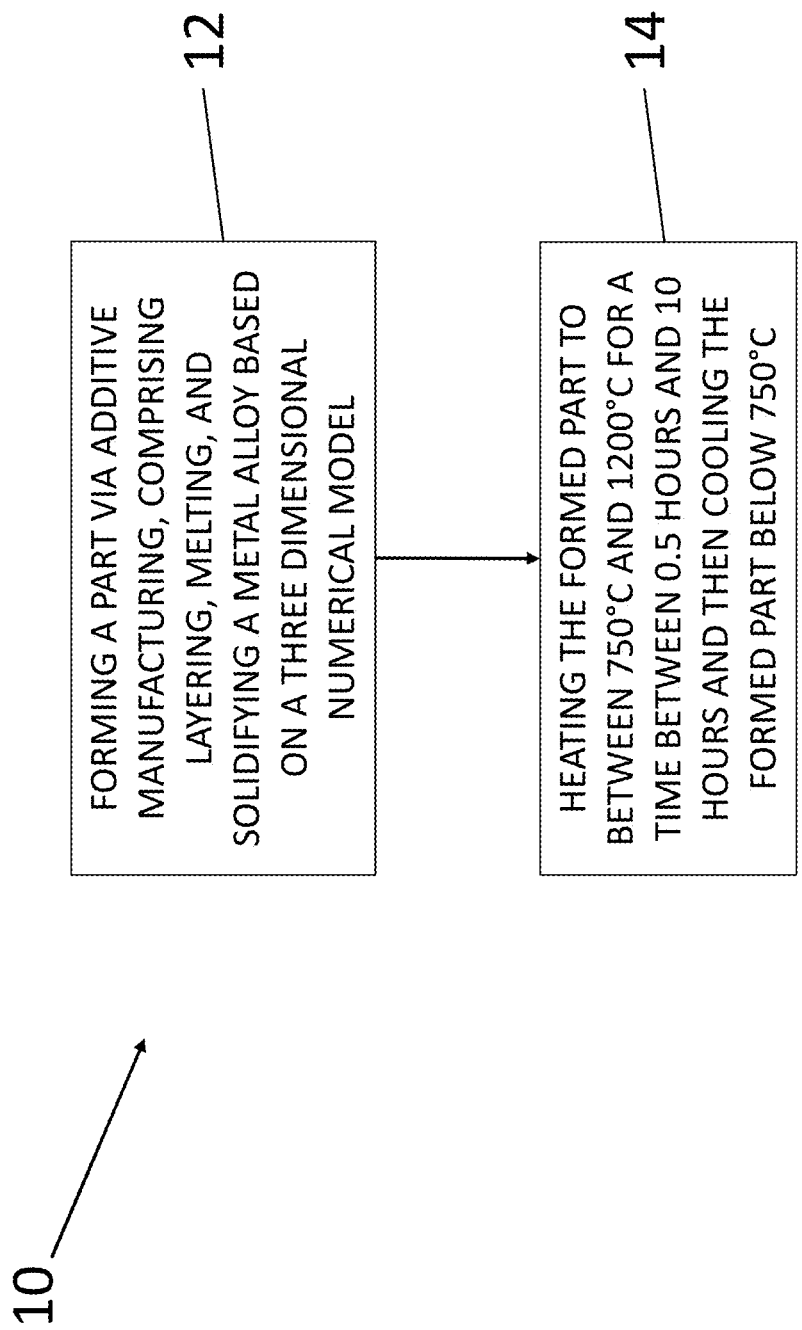
FIG. 1 is a method flow chart for a method of making a part according to an exemplary embodiment.

Referring to FIG. 1, a method 10 of making a part, according to one embodiment, can comprise forming the part via additive manufacturing (step 12). Additive manufacturing refers to a process of fabricating objects layer by layer from three dimensional numerical models, as opposed to subtractive manufacturing. Additive manufacturing for metals can include laser beam melting, electron beam melting, laser metal deposition, electron beam metal deposition, or a combination thereof. These processes can all include the local melting of a deposited powder and/or wire layer which is then rapidly solidified. After exposure of the deposited powder and/or wire layer, another layer can be applied and the process is repeated layer by layer until the completion of the part. Layer thicknesses can range, for example, between about 20 micrometers and about 100 micrometers (e.g., for laser or electron beam melting), and between about 100 micrometers and about 3 millimeters (e.g., for laser or electron beam metal deposition).

Accordingly, forming the part via additive manufacturing (step 12) can comprise layering, melting, and solidifying a metal alloy based on a three dimensional numerical model. The layering, melting, and solidifying of the metal alloy can occur in any order. For example, additive manufacturing can comprise layering a metal alloy in solid form, then melting the metal alloy, and then solidifying the metal alloy. Alternatively, or in addition, additive manufacturing can comprise layering an already melted metal alloy, and then solidifying the melted metal alloy. The metal alloy can be in powder from, wire form, or a combination thereof. The metal alloy can comprise nickel alloy. For example, the nickel alloy can comprise Haynes 282, Inconel 625, Inconel 713, Inconel 718, Inconel 738, Inconel 792, or a combination comprising at least one of the foregoing.

The formed part can comprise a microstructure. Microstructure in metallic materials can refer to the distribution and topological arrangement of grains, phases, interfaces, and other defects in three dimensions. Microstructure can be measured by any suitable means, for example, optical microscopy, scanning electron microscopy, transmission electron microscopy, electron tomography, x-ray tomography, FIB sectioning, FSL sectioning, or a combination thereof.

The microstructure can comprise grains. For example, the grains can have an elliptical shape. The microstructure can comprise an average columnar grain length, an average grain columnar width (measured perpendicular to the grain length), an average grain size number, a porosity, or a combination thereof. For example, the porosity of the formed part can be about 1 micrometer to about 100 micrometers, as measured using optical microscopy, electron microscopy, x-ray tomography, or a combination thereof.

The method 10 of making a part, according to one embodiment, can further comprise heat treating the formed part (step 14). For example, heat treating can include processes such as stress relief, hot isostatic pressing (HIP), solution treatment, aging treatment, and combinations thereof. In these processes, the formed part can be heated at a predefined heating rate to a temperature between, for example, 750° C. and 1200° C., held at this temperature for a time between 0.5 hours and 10 hours, and finally cooled at a predefined rate to below 750° C. In some embodiments, the formed part may be cooled to, and held for, a predefined period at an intermediate temperature between 750° C. and 1200° C. before cooling to below 750° C. In HIP, the formed part can be compressed using a pressurized gas at about 15 kilopounds per square inch (ksi) to about 45 ksi. Cooling the formed part can comprise cooling with air, oil, water, or a combination thereof.

Heat treating the formed part (step 14) can increase the average grain width by greater than or equal to about 300%, for example, greater than or equal to about 400%, for example, greater than or equal to about 500%. For example, after heat treatment, the formed part can have an average columnar grain width of about 100 micrometers to about 400 micrometers, as measured using electron backscattered diffraction. For example, after heat treating, the formed part can have an average columnar grain length of about 400 micrometers to about 1000 micrometers, for example, about 500 micrometers to about 700 micrometers, as measured using electron backscattered diffraction. After heat treating, the surface integrity of the formed part can be enhanced for the purposes of resistance to fatigue by employing localized milling, polishing, and/or shot peening to airfoil and critical hub surfaces.

Figure 2:
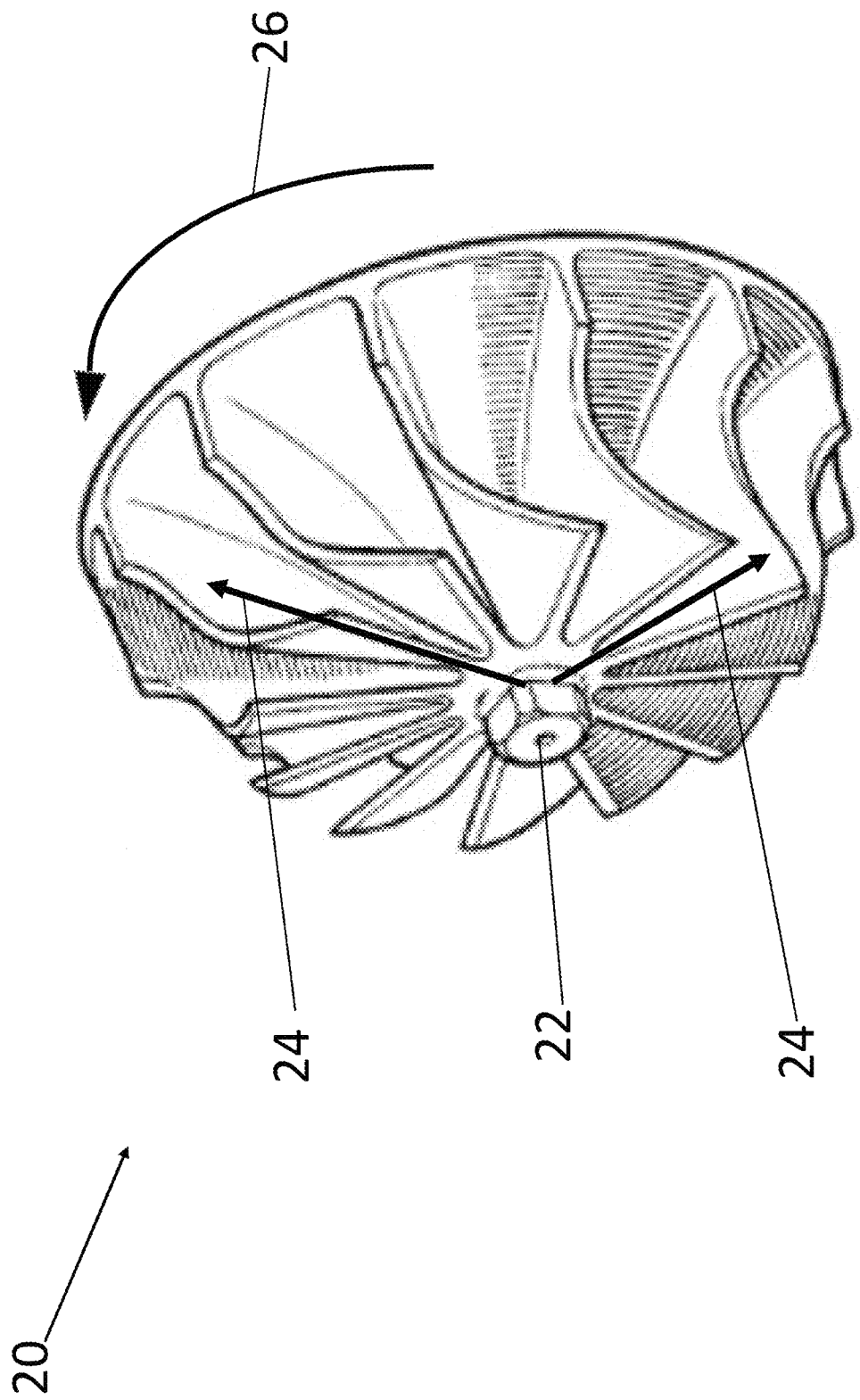
FIG. 2 is a simplified diagram of a radial turbine wheel according to an exemplary embodiment.

Referring to FIG. 2, according to one embodiment, the formed part can be a radial turbine wheel 20. For example, the radial turbine wheel 20 can be part of a gas turbine, for example, the gas turbine can be part of an auxiliary power unit for an aircraft.

The microstructure of the radial turbine wheel 20 can be oriented toward a stress direction of the radial turbine wheel 20. For example, the microstructure can be oriented in a direction 24, radially outward from a center 22 of the formed part. In other words, the microstructure can be oriented so as to combat the centrifugal stresses acting on the radial turbine wheel 20. The microstructure can also be oriented in a direction approximating a direction of rotation 26 of the formed part. This orientation can combat stresses acting on the wheel 20 that are a result of a fluid flow through a gas turbine system which rotates the wheel 20 in direction 26.

The method 10 disclosed herein can provide a radial turbine wheel 20 which is cost effective, resistant to high turbine inlet temperatures, easily repairable, and which provides a balance of both creep and fatigue properties, for example, increased life cyclic limits. For example, a creep rupture life of the formed part can be greater than or equal to about 15,000 hours of operation before failure. A fatigue cycle life of the formed part can be greater than or equal to about 15,000 start to stop cycles of operation before failure. In one embodiment, a ratio of creep rupture life of the formed part in hours of operation before failure, to fatigue cycle life of the formed part in start to stop cycles of operation before failure, can be about 1:1.

In one embodiment, the method does not comprise casting of the metal alloy or wrought manufacturing of the metal alloy. In one embodiment, the formed part is an additional portion of an already existing structure. For example, if a portion of a radial turbine wheel 20 is damaged (e.g., a portion broken off the main structure), the method disclosed herein can be applied to the existing radial turbine wheel 20, wherein a new additional portion is formed that replaces the damaged portion, thus repairing the radial turbine wheel 20. In this way replacement of the entire wheel 20 can be avoided.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of making a part, comprising:
forming the part via an additive manufacturing process, wherein the additive manufacturing process comprises layering, melting, and solidifying a metal alloy based on a three dimensional numerical model, wherein the metal alloy is in powder form; wherein the additive manufacturing process comprises layering the metal alloy in solid form, melting the metal alloy, and solidifying the metal alloy,
wherein the metal alloy comprises a nickel alloy, wherein the nickel alloy comprises Inconel 625, Inconel 713, Inconel 718, Inconel 738, Inconel 792, or a combination comprising at least one of the foregoing nickel alloys;
wherein the additive manufacturing process includes laser metal deposition, electron beam metal deposition, or a combination thereof; and
wherein the formed part comprises a microstructure, wherein the microstructure comprises an average columnar grain length; and
heat treating the formed part, wherein heat treating comprises heating to between 750° C. and 1200° C. for a time between 0.5 hours and 10 hours and then cooling the formed part below 750° C., wherein after heat treating, the formed part has an average columnar grain length of 400 micrometers to 1000 micrometers, as measured using electron backscattered diffraction.

2. The method of claim 1, wherein the formed part is a radial turbine wheel.

3. The method of claim 1, wherein the heat treating is repeated for two or more cycles.

4. The method of claim 1, wherein after heat treating, the formed part has an average columnar grain width of 100 micrometers to 400 micrometers, as measured using electron backscattered diffraction.

5. The method of claim 1, wherein a ratio of creep rupture life of the formed part in hours of operation before failure, to fatigue cycle life of the formed part in start to stop cycles of operation before failure, is 1:1.

6. The method of claim 1, wherein the method does not comprise casting of the metal alloy or wrought manufacturing of the metal alloy.

7. The method of claim 1, wherein the formed part is an additional portion of an already existing structure.

8. The method of claim 1, wherein the microstructure is oriented toward a stress direction of the formed part.

9. The method of claim 8, wherein the microstructure is oriented in a direction radially outward from a center of the formed part, in a direction of rotation of the formed part, or a combination thereof.

10. The method of claim 1, wherein the heat treating increases the average grain width of the formed part by greater than or equal to 300%, as compared to the formed part prior to the heat treating.

11. The method of claim 1, wherein the microstructure comprises a porosity, wherein the porosity of the formed part is 1 micrometer to 100 micrometers, as measured using optical microscopy, electron microscopy, x-ray tomography, or a combination thereof.

12. The method of claim 1, wherein after heat treating, the formed part has an average columnar grain length of 500 micrometers to 700 micrometers, as measured using electron backscattered diffraction.

13. A part formed by the method of claim 1.

14. The part of claim 13, wherein the part is a radial turbine wheel.

15. The part of claim 14, wherein the radial turbine wheel is part of a gas turbine.

16. The part of claim 15, wherein the gas turbine is part of an auxiliary power unit for an aircraft.

* * * * *